United States Patent [19]
Yamashita et al.

[11] Patent Number: 5,965,807
[45] Date of Patent: *Oct. 12, 1999

[54] SENSOR DEVICE WITH A SELF ADJUSTOR FOR ELIMINATING ABNORMAL SENSITIVITY

[75] Inventors: Yasuhiro Yamashita, Nukata-gun; Seiichirou Ootake, Hazu-gun, both of Japan

[73] Assignee: Nippondenso Co., Ltd., Kariya, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/657,536

[22] Filed: Jun. 4, 1996

[30] Foreign Application Priority Data

Jun. 5, 1995 [JP] Japan ..................... 7-138065

[51] Int. Cl.$^6$ ........................................ G01L 5/28
[52] U.S. Cl. ............................... 73/129; 701/70
[58] Field of Search ................. 73/121, 129; 324/71.1, 324/537, 725; 701/70, 71, 76

[56] References Cited

U.S. PATENT DOCUMENTS

| | | | |
|---|---|---|---|
| 4,020,480 | 4/1977 | Gotley et al. | 340/237 R |
| 4,158,396 | 6/1979 | Suzuki et al. | 177/210 R |
| 4,719,796 | 1/1988 | Zenker | 73/121 |
| 5,398,194 | 3/1995 | Brosh et al. | 324/725 |
| 5,473,253 | 12/1995 | Araki | 324/537 |
| 5,631,632 | 5/1997 | Nakashima et al. | 73/121 |

FOREIGN PATENT DOCUMENTS

| | | |
|---|---|---|
| 2641863 | 7/1990 | France . |
| 60-129643 | 8/1985 | Japan . |
| 62-055629 | 11/1987 | Japan . |
| 3-033630 | 2/1991 | Japan . |
| 5-172661 | 7/1993 | Japan . |
| 6-347317 | 12/1994 | Japan . |

*Primary Examiner*—Eric S. McCall
*Attorney, Agent, or Firm*—Pillsbury Madison & Sutro LLP

[57] ABSTRACT

A brake hydraulic pressure detector includes a bridge circuit made up of a semiconductor sensor which generates a detection voltage in accordance with hydraulic pressure and resistors for setting the detection voltage during nonbraking to a nonzero predetermined voltage, an adder circuit for amplifying and generating the detection voltage from the bridge circuit by a predetermined gain, and an output circuit. Here, if the sensitivity of an output voltage with respect to the hydraulic pressure varies, i.e., if the gain varies for some reason, the output voltage during nonbraking also changes because the offset voltage is set to a nonzero voltage. Thus, abnormality in the sensitivity of the brake hydraulic pressure detector can be detected by monitoring the output voltage during nonbraking.

12 Claims, 5 Drawing Sheets

SENSOR DEVICE WITH A SELF ADJUSTOR FOR ELIMINATING ABNORMAL SENSITIVITY

CROSS-REFERENCE TO RELATED APPLICATION

This application is related to and claims priority from Japanese Patent Application No. Hei-7-138065, the contents of which are hereby incorporated by reference.

BACKGROUND OF THE INVENTION

1. Field of the Invention

The present invention relates to a sensor device which includes a bridge circuit made up of detection elements whose resistance values change in accordance with external forces and converts changes in the resistance values to electrical signals, and a method for adjusting such sensor devices.

2. Description of Related Art

Conventionally, one well-known device of this type is a sensor device which uses a pressure detection unit that includes a Wheatstone bridge formed with piezoresistance elements whose resistances change in accordance with an external force.

This device generates a detection signal detected by the bridge circuit after amplifying the same signal using an amplifier so that the output signal is at a signal level at which it can be used by a controller that performs control using the output signal of this device and this device has a predetermined sensitivity in correspondence with the external force.

Also, if the gain of the amplifier fluctuates for some reason, because such fluctuation adversely affects controllability, that is, excessive sensitivity results in over-sensitive control and conversely, insufficient sensitivity results in slower control and the like, there is a need to check for such abnormal sensitivity. This is done, for example, by providing a determination circuit which determines an abnormality when the output voltage from the sensor device exceeds an upper limit of the signal level that can be handled by the controller.

However, in such controller equipped with a determination circuit, there is a problem of being able to perform abnormality detection only when the gain increases resulting in an over-sensitive device and not when sensitivity deteriorates.

Moreover, in order to perform detection of deteriorating sensitivities, there are known devices, for detecting abnormality, having sensor units are doubled and the like so that pressure is detected using a plurality of systems with abnormality detection being performed by comparing the outputs of the sensor units. However, in this case, the increased size of such devices poses a problem.

SUMMARY OF THE INVENTION

In view of the foregoing problems in the prior art in mind, it is an object of the present invention to provide a sensor device whose sensitivity to an external condition can be checked simply based on its output, and a method for adjusting such a sensor device.

In order to achieve the above-described object, one aspect of the present invention provides a sensor device which includes a bridge circuit, which has an output terminal and detection elements whose impedances change with respect to an external condition, for generating a detection voltage which corresponds to change in impedances of the detection elements. The sensor device also includes a constant current circuit for driving the bridge circuit by supplying a constant current, an amplifier for amplifying the detection voltage from the bridge circuit to derive an amplified signal so that sensitivity to the external condition is at a predetermined level and for externally generating the amplified signal, an adjustment circuit for setting an offset voltage that appears at the output terminal of the bridge circuit to a predetermined nonzero value during a reference state, and a determination unit for storing beforehand a storage output from the amplifier during setting of the offset voltage by the adjustment circuit and determining a sensor device abnormality based on an output from the amplifier during the reference state and the storage output.

In this way, a bridge circuit is formed with detection elements whose impedance values change in accordance with an external condition. Thus, when the bridge circuit is driven by a constant current circuit, a voltage that corresponds to the impedance values of the detection elements, that is, a voltage signal which corresponds to the external condition appears at an output terminal of the bridge circuit. The external condition may be, for example, an external force applied on the detection elements. The aforementioned voltage signal is generated after being amplified by an amplifier which amplifies it so that the sensor device is at a predetermined level of sensitivity with respect to the external force applied to the detection elements. It must be noted here that because the bridge circuit is so set that offset voltage that appears at its output terminal when external force is not being applied to the detection elements is set to a predetermined nonzero value using the adjustment circuit, an amplified value of the offset voltage can be derived from the amplifier even if pressure is not being applied to the detection elements. As a result, if the sensitivity of the device fluctuates for some reason (for example, increases in the gain of the amplifier circuit and the like), the output from the amplifier when pressure is not being applied on the detection elements changes in accordance with such change.

Meanwhile, a determination unit stores beforehand an output from the amplifier circuit during the setting of the adjustment circuit and determines that the sensitivity of the amplifier circuit is abnormal when the output from the amplifier circuit detected during nonapplication of external power to the detection elements differs from the stored output.

In other words, because the offset voltage of the bridge circuit is set to a predetermined nonzero value, the output from the amplifier when pressure is not being applied to the detection elements changes in accordance with the change in the sensitivity and so, abnormal sensitivities can be detected by comparing this output with the output during the setting of the adjustment circuit, that is, during the time when the sensitivity is properly set.

Therefore, according to the sensor device of the present invention, abnormal sensitivities can be certainly detected not only when sensitivity becomes excessive but also for the case when sensitivity is insufficient.

Also, according to the present invention, this detection of abnormality is implemented by only setting the offset voltage of the bridge circuit to a nonzero predetermined value and by providing a determination unit for determining the output from the amplifier. Therefore, compared with conventional devices which cannot perform such detection without doubling the units, the sensor device can be significantly miniaturized.

Another aspect of the present invention provides a sensor device wherein the adjustment circuit is a trimming resistor connected in parallel or in series with the detection elements that form the bridge circuit.

In this way, with the use of trimming resistors which are variable resistors that do not have moving parts, the reliability of the sensor device can be enhanced because there will be no changes in the resistance values due to vibration and the like after setting such resistance values.

Meanwhile, there is a need to adjust the offset voltage of the bridge circuit and the sensitivity of the output circuit to external forces for the sensor device. The adjustment of the offset voltage is executed by adjusting the resistance balance of the bridge circuit, causing no change to the gain of the amplifier. On the other hand, adjustment of the sensitivity is normally performed by applying a predetermined external force to the detection elements and adjusting the gain of the amplifier so that the output from the amplifier is at a predetermined level, and by making adjustments so that desired outputs are derived at two arbitrary points, the entire sensitivity can be adjusted.

In addition, when the offset voltage of the bridge circuit is set to zero, the entire sensitivity can be adjusted by adjusting the output at one other point because the output of the amplifier circuit remains the same when pressure is not being applied even if the gain of the amplifier is changed.

However, if the offset voltage is set to a nonzero predetermined value, because the offset voltage changes when pressure is applied on the detection element and adjustments on the sensitivity are performed to obtain the predetermined output level, the characteristics would not be at the desired level unless adjustments of the offset voltage and the sensitivity are performed repeatedly and thus, the adjustments would be very difficult to perform.

In this light, a further aspect of the present invention provides a method for adjusting a sensor device which includes the steps of applying a predetermined pressure on the detection elements of the bridge circuit and setting the gain of the amplifier circuit so that amplifier circuit output is at a predetermined level while an offset voltage of the bridge circuit is set to zero and subsequently setting an offset voltage of the bridge circuit to a nonzero predetermined value using the adjustment circuit.

In this way, the adjustment of the output voltage can be executed separately and thus, adjustments can be performed simply with fewer operations.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PRESENTLY PREFERRED EXEMPLARY EMBODIMENT

A preferred embodiment of the present invention is described hereinafter with reference to the accompanying drawings.

Figure 1:
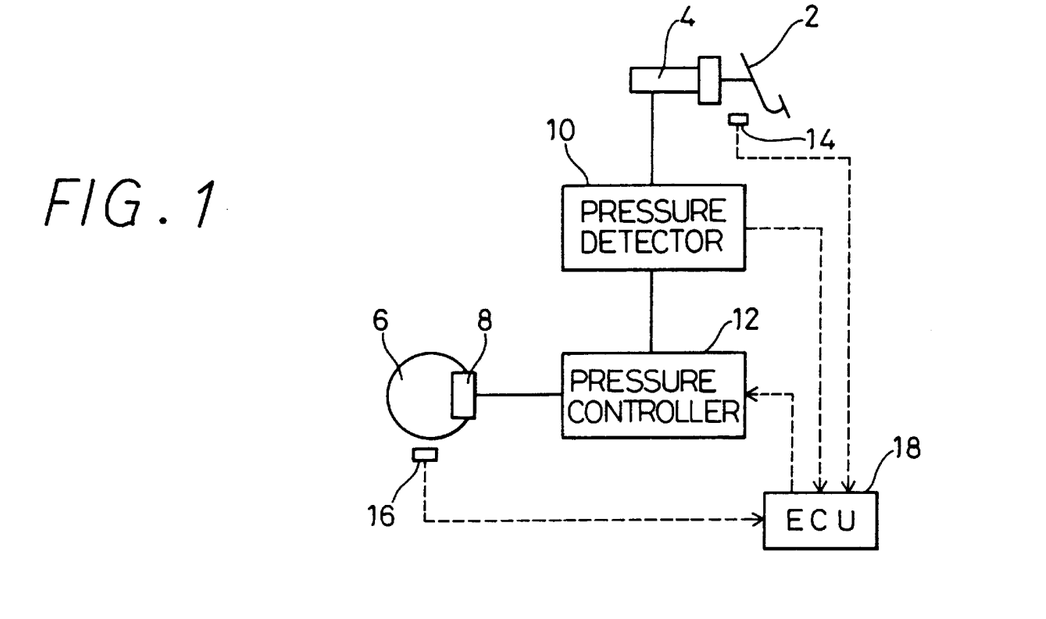
FIG. 1 is a schematic view showing a construction of an anti-skid controller according to a first preferred embodiment of the present invention.

FIG. 1 is a block diagram of an anti-skid controller to which an embodiment of the present invention is applied. While the same figure shows a control system of the anti-skid control system of only one wheel for purposes of simplicity, it is a well-known fact that such a control system is installed in every wheel of a vehicle.

As shown in FIG. 1, the anti-skid controller of the present embodiment includes a master cylinder 4 for generating hydraulic pressure in accordance with a depression of a brake pedal 2, a wheel cylinder 8 for applying a brake force on a vehicle wheel 6, a hydraulic pressure controller 12 for controlling increase and decrease in hydraulic pressure supplied to the wheel cylinder 8 based on hydraulic pressure from the master cylinder 4 and external commands, a brake hydraulic pressure detector 10 provided in a hydraulic pressure route that connects the master cylinder 4 and the hydraulic pressure controller 12 for detecting hydraulic pressure generated by the master cylinder 4, a brake switch 14 for generating a detection signal when the brake pedal 2 is being manipulated, a vehicle wheel speed sensor 16 for detecting the rotation speed of the vehicle wheel 6 and an electronic control unit (hereinafter referred to as ECU) 18 for controlling the hydraulic pressure controller 12 based on detection signals from vehicle wheel speed sensors which detect rotation speeds of vehicle wheels excluding the vehicle wheel 6. As is known in anti-skid control technology field, the hydraulic pressure controller 12 is made up of a hydraulic pressure circuit which includes pumps, pressure control valves and the like.

The ECU 18 detects slips in the vehicle wheel 6 during vehicle braking, controls brake hydraulic pressure of the wheel cylinder 8 when slips occur, performs anti-skid control for optimal braking without making the vehicle wheel 6 lock and detects an abnormality in the sensitivity of the brake hydraulic pressure detector 10 based on the brake hydraulic pressure during nonbraking. The ECU 18 includes a microprocessor made up of a CPU, ROM, RAM and the like.

Figure 2:
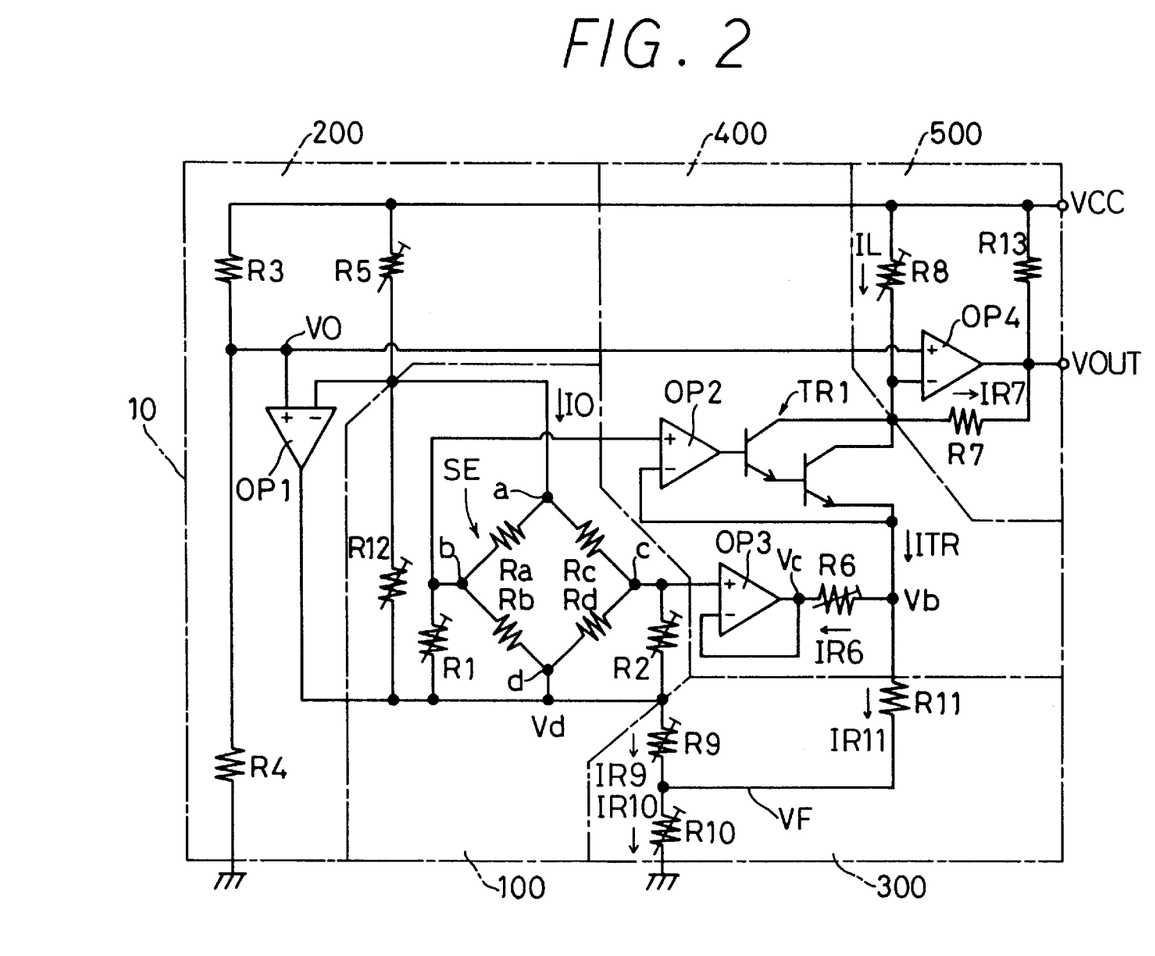
FIG. 2 is an electric circuit diagram of a brake hydraulic pressure detector in the embodiment.

Next, as shown in FIG. 2, the brake hydraulic pressure detector 10 includes a bridge circuit 100 for converting brake hydraulic pressure into an electrical signal using the piezoresistance effect observed in semiconductors, a constant current circuit 200 for supplying a constant level of current to the bridge circuit 100, and a compensation circuit 300 for generating a temperature compensation signal for compensating temperature characteristics of a detection signal generated by the bridge circuit 100. The brake hydraulic pressure detector 10 further includes an adder circuit 400 for compensating temperature characteristics of the detection signal from the bridge circuit 100 by adding the detection signal generated by the bridge circuit 100 and the temperature compensation signal generated by the compensation circuit 300 and an output circuit 500 for amplifying the temperature-compensated detection signal from the adder circuit 400 and outputting the amplified signal.

Here, the bridge circuit 100 is made up of four diffused resistors Ra, Rb, Rc, Rd, which forming a semiconductor pressure sensor SE. These diffused resistors Ra, Rb, Rc, Rd are formed in a pressure sensitive region of a silicon diaphragm and are made so that their resistance values vary in accordance with applied pressure because of stress distortion that occurs in the pressure sensitive region. In addition, the bridge circuit 100 includes resistors R1, R2 for compensating a detection voltage Vbc (=Vb−Vc) which appears between output terminals b, c and a resistor R12 for compensating the sensitivity-temperature characteristics of the semiconductor pressure sensor SE itself. During nonbraking, in other words, when pressure is not being applied on the semiconductor pressure sensor SE, the detection voltage Vbc is set to a predetermined offset voltage Voff (≠0).

Meanwhile, the constant current circuit 200, which includes resistors R3, R4, R5 and an operational amplifier OP1, divides electric power source voltage VCC using resistors R3, R4 to derive reference voltage VO and supplies a constant current IO to a positive terminal a of the bridge circuit 100 which is determined from the reference voltage VO and the resistance value of the resistor R5.

Next, the adder circuit 400 provides voltages Vb, Vc, which appear at output terminals b, c of the bridge circuit 100, to respective ends of the resistor R6 via a buffer which includes operational amplifiers OP2, OP3 and converts the voltage difference, that is, the detection voltage Vbc into current IR6 which flows through a resistor R6. Therefore, the current IR6 is expressed as in Eq. 1. In this light, the adder circuit 400 is also referred to as a current converter.

$$IR6=Vbc/R6 \quad (1)$$

Also, the compensation circuit 300 is connected to this adder circuit 400. A summation of the current IR6 and a temperature characteristic compensation current signal IR11 generated in the compensation circuit 300, that is, current ITR (=IR6+IR11) is provided to the output circuit 500 via the transistor TR1.

The compensation circuit 300 includes three resistors R9, R10, R11 which are in a Y-connection. One end of the resistor R9 is connected to a negative terminal d of the bridge circuit 100 while one end of the resistor R10 is grounded. In addition, the resistor R11 is set so that a temperature characteristic compensation current IR11 that flows through it is significantly smaller than currents IR9, IR10 which flow through resistors R9, R10, respectively. One end of the resistor R11 is connected to a Vb side terminal of the resistor R6 of the adder circuit 400.

In this compensation circuit 300, it is a known fact that the temperature characteristic compensation signal IR11 for compensating the temperature characteristics of the output voltage VOUT can be derived when a voltage VF at a connection point of the resistors R9, R10, R11 is expressed as in Eq. (2). This voltage VF is set by adjusting the resistors R9 and R10. It must be noted here that Vd is the voltage at a negative terminal d of the bridge circuit 100 and $\Delta$Vd and $\Delta$VOUT are measured values of the temperature characteristics of the voltage Vd and the output voltage VOUT, respectively.

$$Vf=(Vd/2)+(R11 \cdot \Delta VOUT \cdot Vd)/(R7 \cdot \Delta Vd) \quad (2)$$

Next, the output circuit 500 supplies a constant current IL, which is determined based on the reference voltage VO and the resistor R8, to the adder circuit 400 and the resistor R7. Thus, the output circuit 500 makes a current IR7 (=IL−ITR) flow through the resistor R7 and generates the voltage signal VOUT in accordance with the output current ITR of the current converter 400. It must be noted here that the resistor R13 is for supplying driving current to a device connected to the output terminal. Current IL and the output voltage VOUT are expressed in Eqs. 3 and 4.

$$IL=(VCC-VO)/R8 \quad (3)$$

$$VOUT=VO-(IL-ITR) \cdot R7 \quad (4)$$

Here, if the temperature characteristic compensation signal IR11 is considered to be significantly smaller than the detection current IR6, that is, if ITR≈IR6, then the following equation can be derived from Eqs. (1), (3) and (4).

$$VOUT=Vy+(R7/R6) \cdot Vbc \quad (5)$$

Here, Vy is defined as Vy=VO−(R7/R8)·(VCC−VO).

In other words, the sensitivity of the output voltage VOUT with respect to the detection voltage Vbc can be adjusted based on the resistor R6 while the output level can be adjusted based on the resistor R8.

In addition, during vehicle braking, setting an unbalanced voltage that appears when hydraulic pressure is applied on the semiconductor pressure sensor SE which forms the bridge circuit 100 as Vi, then because the sum of this unbalanced voltage Vi and the offset voltage Voff becomes the detection voltage Vbc (=Voff+Vi), Eq. 5 can be expressed as follows.

$$VOUT=Vx+G \cdot Vi \quad (6)$$

$$Vx=Vy+G \cdot Voff \quad (7)$$

Vx is the output voltage during nonbraking (Vi=0) and G (=R7/R6) is the sensitivity with respect to the unbalanced voltage which is produced in accordance with the hydraulic pressure P.

It must be noted here that in the brake hydraulic pressure detector 10, trimmed potentiometers which can be laser trimmed are used for the resistors R1, R2, R5, R6, R8, R9, R10, and R12 and that circuit characteristics can be changed by trimming these resistors.

For the brake hydraulic pressure detector 10 constructed in this way, when the brake pedal 2 is depressed and hydraulic pressure P which corresponds to the amount of depression of the brake pedal 2 is generated by the master cylinder 4, detection voltage Vbc changes due to changes in the resistance values of the diffused resistors Ra, Rb, Rc, Rd, which form the bridge circuit 100, in correspondence with such hydraulic pressure P, and the output voltage VOUT is generated in accordance with such change in the detection voltage Vbc.

Meanwhile, in the present embodiment, the offset voltage Voff is set to a nonzero predetermined value. Therefore, when the sensitivity G changes for some reason, as can be clearly seen from Eqs. 6 and 7, the output voltage VOUT during nonbraking (in other words, Vi=0) also changes accordingly. For example, if the amount of change in the sensitivity is $\Delta$G, the amount of change in the output voltage VOUT is $\Delta$G·Voff.

Figure 3A:
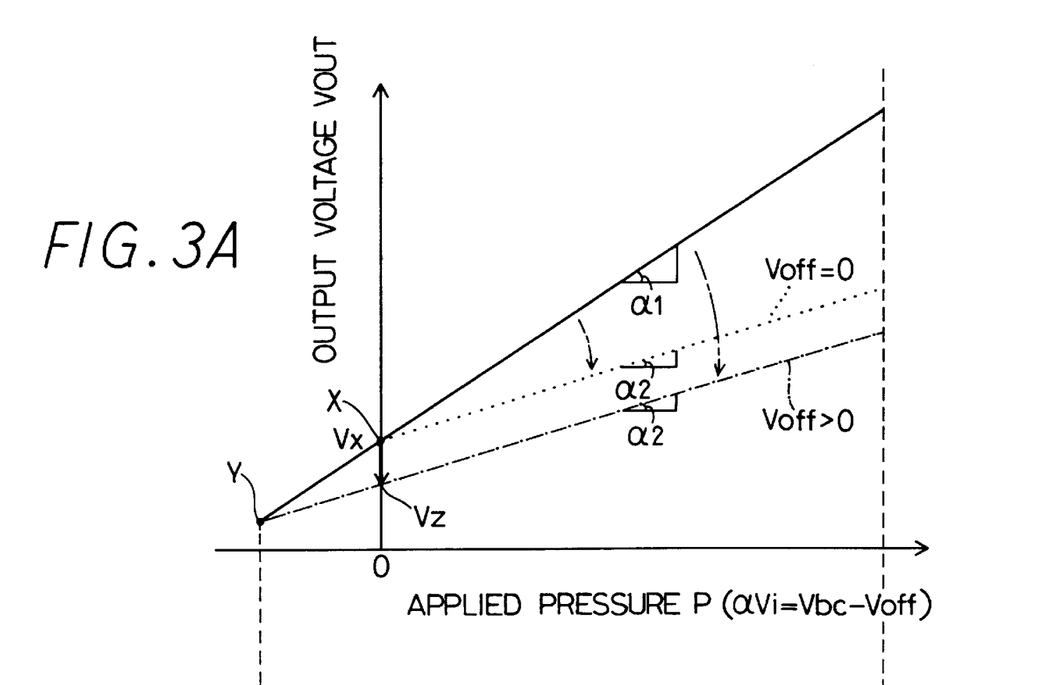
FIGS. 3A and 3B are graphs showing characteristics of the brake hydraulic pressure detector in the embodiment.
Figure 3B:
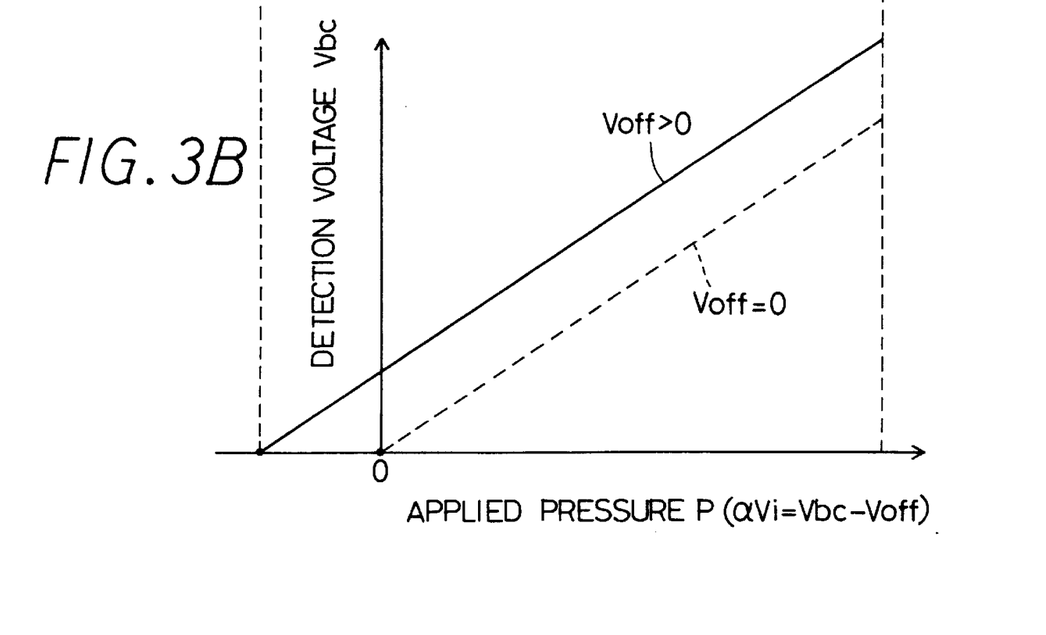

This situation is shown in FIGS. 3A and 3B. FIG. 3A is a characteristic diagram of the output voltage VOUT with respect to the hydraulic pressure P applied to the semiconductor pressure sensor SE of the bridge circuit 100 while FIG. 3B is a characteristic diagram of the detection voltage Vbc of the bridge circuit 100 with respect to the same hydraulic pressure P.

FIG. 3B shows a solid line which represents the present embodiment, that is, the characteristics of the offset voltage Voff which is the detection voltage Vbc of the bridge circuit 100 when the offset voltage Voff is greater than zero, while, for purposes of comparison, a dashed line in the same figure shows the characteristics when the offset voltage Voff is set to zero. As shown in this figure, the bridge circuit 100 generates the detection voltage Vbc which is proportional to the hydraulic pressure P.

Moreover, FIG. 3A shows a solid line which represents the characteristics of the output voltage VOUT when the bridge circuit 100 is set to a desired sensitivity G=α1 and a desired output level and the brake pressure hydraulic pressure detector 10 is set to have the characteristics shown in FIG. 3B.

Here, supposing that the sensitivity G changes for some reason to become G=α2 (<α1), then the characteristics line of the output voltage VOUT pivots around the point where the detection voltage Vbc is zero (the output voltage VOUT does not change with respect to the sensitivity G). That is, when the offset voltage Voff=0, the characteristic will be as shown by the dotted line with a point X serving as the center of rotation and when the offset voltage Voff>0, the characteristic will be as shown by the dot and dash line with a point Y serving as the center of rotation.

Accordingly, while the output voltage VOUT during nonbraking (P=0) does not change and remains equal to Vx when the offset voltage Voff=0, the output voltage VOUT during nonbraking when offset voltage Voff>0, which is the case of the present embodiment, will become smaller by ΔG·Voff so that VOUT=Vz. It goes without saying that the output voltage VOUT during nonbraking increases by ΔG·Voff when sensitivity G changes to a larger value.

Figure 4:
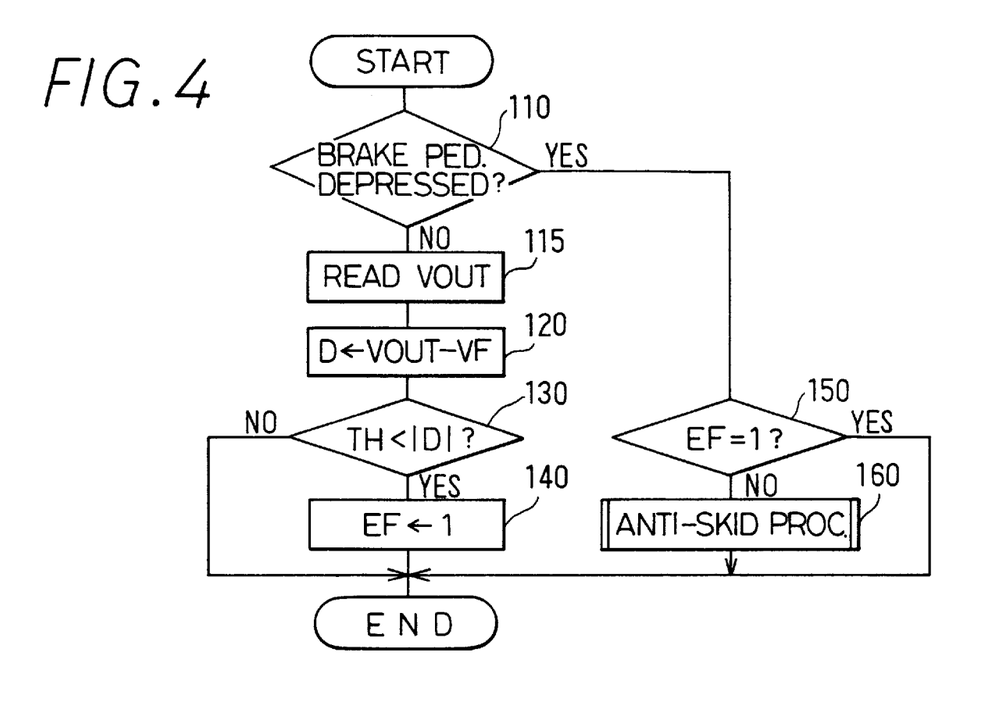
FIG. 4 is a flowchart of a brake process executed by an ECU in the embodiment.

Next, a brake process executed by the ECU 18 is explained with reference to the flowchart shown in FIG. 4.

This process is executed repeatedly after turning on the vehicle electric power and after the execution of a predetermined initialization process. An error flag EF used in this process is reset in the initialization process. The output voltage VOUT of the brake hydraulic pressure detector 10 during nonbraking (hydraulic pressure P=0) is measured beforehand during adjustments and the like and is stored in a nonvolatile memory in the ECU 18 as a reference voltage VF for determining abnormal sensitivities. That is, for the case of FIG. 3A, voltage Vx is set as the reference voltage VF.

When the brake process is activated, first, step 110 determines if the driver is depressing the brake pedal 2 or not by checking if the brake switch 14 is actuated or not. If the brake switch 14 is deactuated, and it is determined that the brake pedal 2 is not being depressed, then control goes to step 115 with the assumption that the vehicle is in a nonbraking state.

Step 115 reads the output voltage VOUT from the brake hydraulic pressure detector 10. A subsequent step 120 computes a difference D by subtracting the reference voltage VF from the output voltage VOUT.

A subsequent step 130 determines if the absolute value |D| of the difference D is greater than a predetermined threshold value TH or not. If so, control goes to step 140 which sets the error flag EF and this brake process terminates. On the other hand, if the absolute value |D| of the difference D is less than TH, then the process terminates as is.

Meanwhile, if step 110 determines that the brake switch is actuated and the brake pedal is being depressed, control goes to step 150 with the assumption that the vehicle is in the braking state. Step 150 determines if the error flag EF is set or not. If the error flag EF is not set, control goes to step 160 which performs a predetermined anti-skid process and after which, this brake process terminates.

If step 150 determines that the error flag EF is set, then the brake process terminates without executing the anti-skid process.

It must be noted here that in the anti-skid process of step 160, vehicle body speed and vehicle wheel speed are determined based on detection signals from the wheel speed sensor 16, the hydraulic pressure controller 12 is driven so that the slip rate of the vehicle 6 is within a predetermined range (for example, 10–20%). Accordingly, not only is the brake hydraulic pressure supplied to the wheel cylinder controlled but also, for example, control which reflects the intentions of the driver as seen in the strength of the driver's depression of the brake pedal 2 (in other words, brake hydraulic pressure) is executed by varying the allowable range for slip rates and delicately changing the brake effectiveness in accordance with the output voltage VOUT of the brake hydraulic pressure detector 10. While the control process here is not the main concern of the present invention and detailed explanations about it are omitted here, it must be remembered that brake hydraulic pressure detected in the above manner can be used not only in anti-skid control but also in other forms of control as information that reflects the intentions of the driver.

As explained above, in the anti-skid controller of the present embodiment, the offset voltage Voff of the bridge circuit 100 which forms the brake hydraulic pressure detector 10 is set to a nonzero predetermined value and when the sensitivity G of the output voltage VOUT to the hydraulic pressure P changes for some reason (for example, malfunctions and damages in the operational amplifiers OP2, OP3, OP4, resistors R6, R7 and transistor TR1), the anti-skid controller of the present embodiment is so constructed that the output voltage VOUT of the brake hydraulic pressure detector 10 during nonbraking (P=0) changes in accordance with such change. Also, during nonbraking, the output voltage VOUT is read and abnormal sensitivity in the brake hydraulic pressure detector 10 is determined by comparing such output voltage VOUT with the reference value VF of the output voltage VOUT during nonbraking that is measured and set beforehand.

Therefore, according to the present embodiment, abnormal sensitivity in the brake hydraulic pressure detector 10 can be detected through the very simple method of comparing the output voltage VOUT of the brake hydraulic pressure detector 10 with the reference voltage VF that is stored beforehand. Moreover, cases when the sensitivity becomes excessive or insufficient can be both detected and thus, the present device can be constructed to be smaller than conventional devices which are formed with duplex detectors.

Also, according to the present invention, when the sensitivity G fluctuates by ΔG, because the output voltage VOUT during nonbraking will change by only ΔG·Voff, the setting of the offset voltage Voff enables unrestricted setting of the accuracy in detecting change in the sensitivity.

Furthermore, according to the present embodiment, because all resistors used for adjustments have no moving parts because they are made up of trimmed resistors, they can be used in environments where there are many vibrations and there is no possibility that their adjusted resistance values would change due to the vibrations. Thus, a highly reliable anti-skid controller can be formed.

Figure 5:
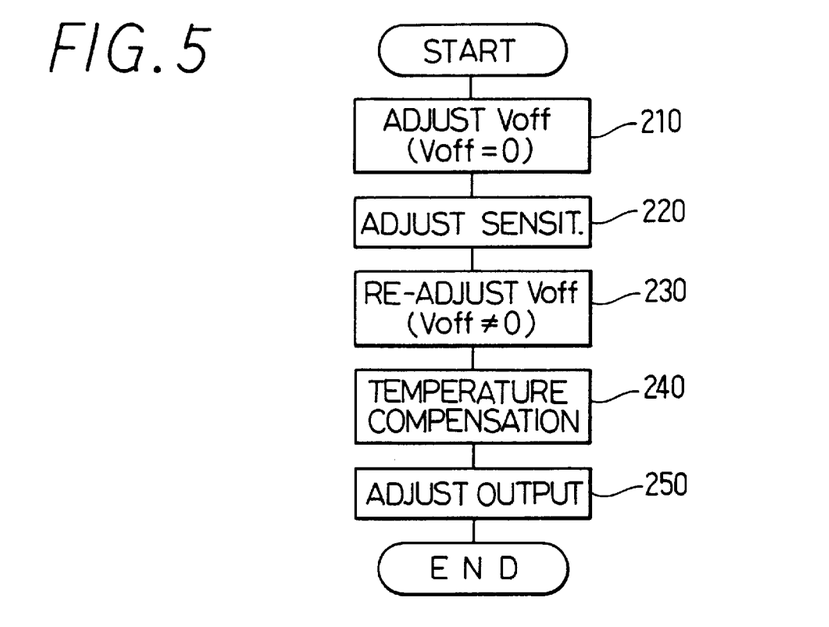
FIG. 5 is a flowchart of an adjustment procedure of the brake hydraulic pressure detector in the embodiment.
Figure 6:
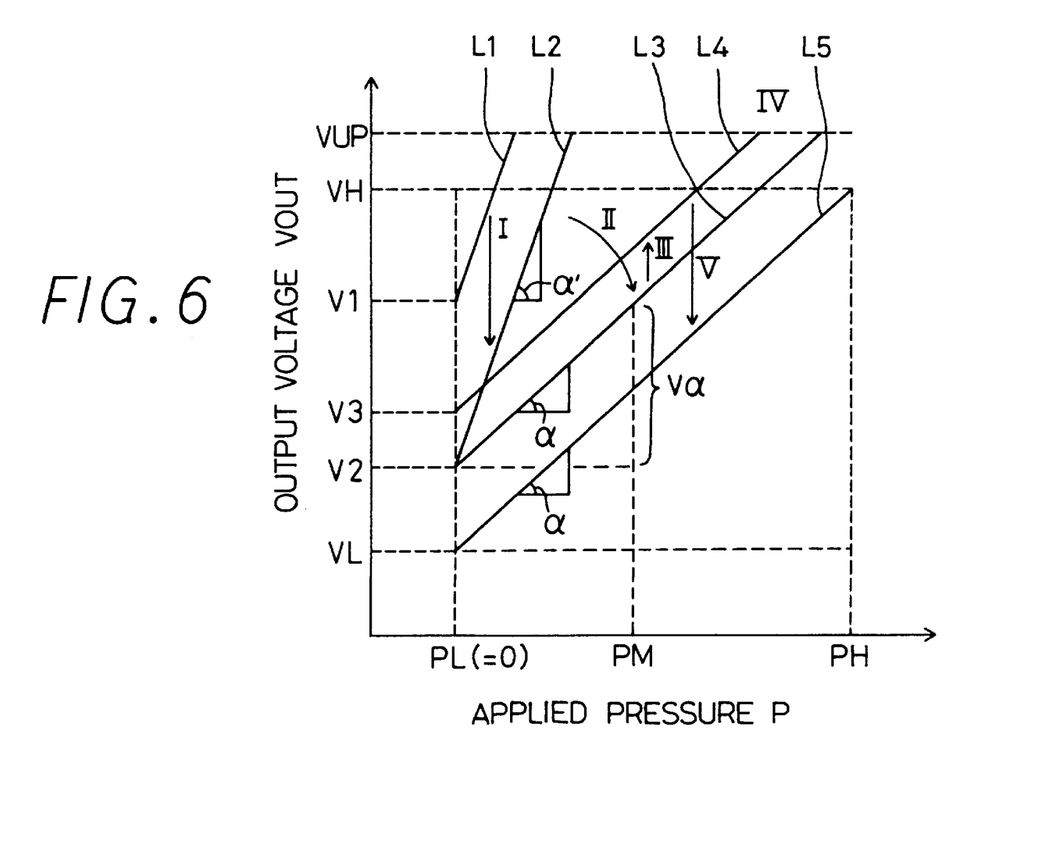
FIG. 6 is a graph showing circuit characteristic changes when adjustments are performed following the adjustment procedure shown in FIG. 5.

Next, an adjustment procedure of the brake hydraulic pressure detector 10 is explained with reference to the flowchart shown in FIG. 5 and the graph shown in FIG. 6 which shows changes in the characteristics of the output voltage VOUT which occur when adjustments are made following the flowchart.

It must be noted here that PH and PL refer to the maximum and minimum values, respectively, of the hydraulic pressure P to be detected by the bridge circuit 100. The output level and sensitivity are adjusted so that output voltage VOUT becomes VH when the applied pressure is PH and VL when the applied pressure is PL. That is, the output level and sensitivity are adjusted so that the characteristic of the output voltage with respect to the applied pressure P would be as shown by a straight line L5 in FIG. 6.

First, as shown by line L1, the circuit characteristic of the unadjusted brake hydraulic pressure detector 10 has a very large sensitivity G=α'. This is because the resistor R6 for adjusting the sensitivity G is unadjusted and its resistance value is very small.

In addition, similarly, the resistor R8 for adjusting the output level also has a small resistance value and as is, because the output voltage VOUT will greatly deviate from the above-described range between VH and VL and adjustment will be difficult, connecting a constant current circuit to an end opposite that connected to the electric power source of the resistor R8 and controlling electric current that flows through the adder circuit 400 would shift the output voltage to a range where adjustments could be performed. The steps executed for the adjustment are described below.

I. First, in step 210, at a state where pressure is not being applied to the semiconductor pressure sensor SE (at P=PL), resistors R1, R2 are trimmed and adjusted so that the offset voltage of the bridge circuit 100 is set to zero. Here, because the offset voltage Voff>0 before adjustments were made, the output voltage VOUT shifts to lower values due to the adjustment and the characteristics will be as shown by line L2.

II. Next, in step 220, at a state where a predetermined pressure is applied to the semiconductor pressure sensor SE (at P=PM), the resistor R6 is trimmed and adjusted so that the output voltage VOUT equals a predetermined amount (V2+Vα). Because the offset voltage Voff is set to zero at this point, there will be no changes in the output voltage V2 during the nonapplication of pressure and only the slope of line L2 changes and so the characteristic will be as shown by line L3 and a predetermined sensitivity G is set to α.

III. In step 230, again at the state in which pressure is not being applied to the semiconductor pressure sensor SE (at P=PL), resistors R1, R2 are trimmed and adjusted so that offset voltage Voff is set to a nonzero predetermined number. Here, because the offset voltage Voff is set to a predetermined number so that Voff>0, the output voltage VOUT shifts to a larger value because of such adjustment and its characteristic will be as shown by a line L4.

IV. Next, in step 240, the actual temperature characteristics of the output voltage VOUT of the brake hydraulic pressure detector 10 and the voltage Vd of the negative terminal d of the bridge circuit are measured and based on Eq. 2 described above, temperature compensation of the bridge circuit 100 is performed by adjusting resistors R9, R10 and R11.

Sensitivity and output level does not change at this point and the characteristic of the output voltage VOUT remains as shown in line L4.

V. At the end, in step 250, the constant current circuit connected to one end of the resistor R8 is disconnected and at the state in which pressure is not being applied to the semiconductor pressure sensor SE, the resistor R8 is trimmed and adjusted so that the output voltage is equal to VL. In this way, the characteristic represented by line L5 which embodies the desired sensitivity and output level is derived.

As explained above, first, offset voltage Voff is set to zero and after adjusting the sensitivity at this condition, the offset voltage Voff is set to a desired value. In this way, during adjustment of the sensitivity, the output voltage VOUT during the nonapplication of pressure to the semiconductor pressure sensor SE will remain unchanged and adjustments can be made easily because the adjustment of the offset voltage Voff and the adjustment of the sensitivity G can be performed separately.

While one embodiment of the present invention has been described above, it should be noted that the present invention is not limited to such and can be implemented in various forms without departing from the spirit of the present invention.

For example, while the reference voltage VF for determining abnormal sensitivity is measured beforehand during adjustments of the brake hydraulic pressure detector 10 and the like and stored in the ROM for the above-described embodiment, it can also be that the reference voltage VF is set to the output voltage VOUT by depressing a command switch (not shown) after installing the brake hydraulic pressure detector 10 in the vehicle.

Figure 7A:
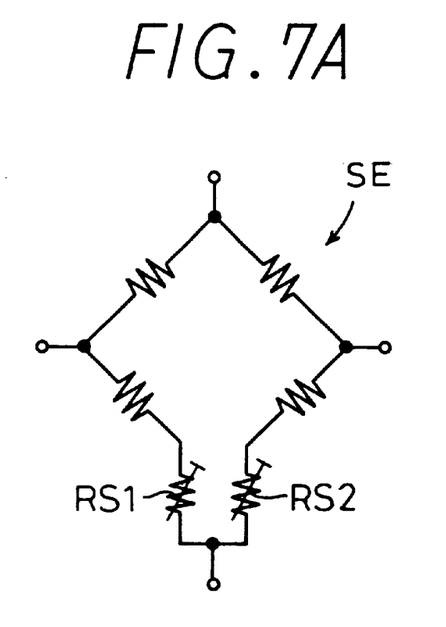
FIGS. 7A and 7B are diagrams of other constructions of the bridge circuit in the brake hydraulic pressure detector.

Also, while the resistors R1, R2 for adjusting the offset voltage Voff are connected in parallel with thin film resistors Rb, Rd which form the semiconductor pressure sensor SE in the foregoing embodiment, as shown in FIG. 7A, adjustment resistors RS1, RS2 may be connected in series with either pair of adjacent thin film resistors.

Figure 7B:
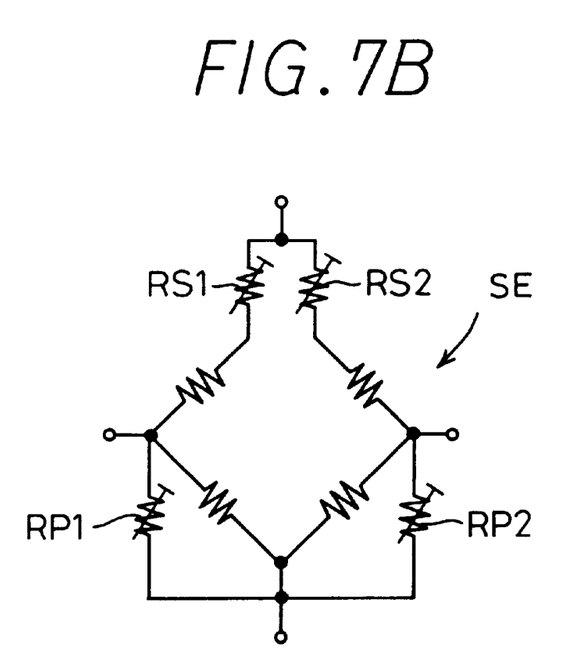

Also, as shown in FIG. 7B, adjustment resistors RS1, RS2 may be connected in series with either pair of adjacent thin film resistors together with connecting the other pair of thin film resistors in parallel with adjustment resistors RP1, RP2. With this kind of connection, if resistors RS1, RS2, RP1, RP2 are provided following a predetermined procedure, then such can provide a setting that cancels the temperature characteristics of the semiconductor pressure sensor SE and thus, a brake hydraulic pressure sensor SE can be formed without the compensation circuit 300.

Furthermore, while the determination unit is implemented as a programmed CPU, it can also be implemented as an electric circuit. Also, the determination unit need not be used only for detecting abnormal sensitivities but may also be used in detecting abnormalities in the bridge circuit 100 and the constant current circuit 200.

Moreover, while the brake hydraulic pressure is detected using the semiconductor pressure sensor SE in the present embodiment, such construction in which vehicle acceleration is detected can also be employed. In this case, when the vehicle is at a stop, abnormality in the output voltage VOUT is detected and when an abnormality is determined, such construction where the execution of processes based on the acceleration of the vehicle is prohibited may be employed.

Furthermore, it must be noted that the present invention is not in any way limited to pressure sensors having a bridge construction.

Although the present invention has been fully described in connection with preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. A sensor device comprising:
   a bridge circuit, which includes an output terminal and detection elements whose impedances change with respect to an external condition, for generating a detection voltage across said output terminal, which corresponds to changes in said impedances of said detection elements;
   a constant current circuit for driving said bridge circuit by supplying a constant current to said bridge circuit;

an amplifier unit for amplifying said detection voltage from said bridge circuit to derive and externally generate an amplifier signal so that sensitivity of said sensor device to said external condition is at a predetermined level and said amplifier signal increases in response to an increase in said detection voltage;

an adjustment circuit for setting an offset voltage that appears at said output terminal of said bridge circuit to a predetermined nonzero positive value in a reference state in which said external condition is not applied to said detection elements, whereby a zero value of said detection voltage represents absence of said external condition; and determination means for storing a reference output from said amplifier unit when said offset voltage is set to said predetermined nonzero positive value by said adjustment circuit during an initial occurrence of said reference state, and for determining a sensor device abnormality by comparing said reference output to an output from said amplifier unit during a subsequent occurrence of said reference state while said detection elements are in a state in which said impedances change with respect to said external condition;

wherein, a characteristics line corresponding to said amplifier signal pivots around a point corresponding to said zero value of said detection voltage, when said sensitivity of said sensor device to said external condition deviates from said predetermined level.

2. A sensor device according to claim 1, wherein said detection elements are diffused resistors.

3. A sensor device according to claim 1, wherein said bridge circuit is further for generating said detection voltage which corresponds to change in impedances of said detection elements due to external pressure applied on said detection elements.

4. A sensor device according to claim 1, wherein said adjustment circuit includes trimming resistors that are connected in parallel with said detection elements of said bridge circuit.

5. A sensor device according to claim 1, wherein said adjustment circuit includes trimming resistors that are connected in series with said detection elements of said bridge circuit.

6. A sensor device according to claim 1, wherein said adjustment circuit includes a pair of trimming resistors that are connected in series with respective ones of a pair of said detection elements of said bridge circuit and another pair of trimming resistors that are connected in parallel with respective ones of another pair of detection elements of said bridge circuit.

7. A sensor device according to claim 1, wherein said bridge circuit includes a resistor for adjusting sensitivity characteristics of said bridge circuit.

8. A sensor device according to claim 1, said sensor device further comprising a compensation circuit for compensating temperature characteristics of said detection voltage generated by said bridge circuit by generating a compensation signal, wherein said amplifier unit includes:

adding means for adding said compensation signal from said compensation circuit and said detection voltage from said bridge circuit to derive a compensated signal; and output means for externally generating said compensated signal.

9. A sensor device according to claim 1, wherein said reference state is a state in which temperature is at a predetermined reference temperature.

10. A sensor device according to claim 1, wherein:

said determination means further determines said sensor device abnormality when said output from said amplifier unit during said reference state differs from said reference output by no less than a predetermined amount.

11. A sensor device comprising:

a bridge circuit, which includes an output terminal and detection elements whose impedances change with respect to an external condition, for generating a detection voltage across said output terminal, which corresponds to changes in said impedances of said detection elements;

a constant current circuit for driving said bridge circuit by supplying a constant current to said bridge circuit;

an amplifier unit for amplifying said detection voltage from said bridge circuit to derive and externally generate an amplifier signal so that sensitivity of said sensor device to said external condition is at a predetermined level;

an adjustment circuit for setting an offset voltage that appears at said output terminal of said bridge circuit to a predetermined nonzero value in a state in which said external condition is not applied to said detection elements;

detecting means for detecting a reference state in which said external condition is not applied to said detection elements after said detection elements are placed in a state where they are sensitive to application of external conditions; and determination means for storing a reference output from said amplifier unit when said offset voltage is set to said predetermined nonzero value by said adjustment circuit, and for determining a sensor device abnormality by comparing said reference output to an output from said amplifier unit when said detecting means detects said reference state.

12. A sensor device comprising:

a bridge circuit, which includes an output terminal and detection elements whose impedances change with respect to an external condition, for generating a detection voltage across the output terminal, which corresponds to changes in the impedances of the detection elements;

a constant current circuit for driving the bridge circuit by supplying a constant current to the bridge circuit;

an amplifier unit for amplifying the detection voltage from the bridge circuit to derive and externally generate an amplifier signal so that sensitivity of the sensor device to the external condition is at a predetermined level;

an adjustment circuit for setting an offset voltage that appears at the output terminal of the bridge circuit to a predetermined nonzero value during a reference state in which the external condition is not present; and determination means for (i) storing an output from the amplifier unit when the offset voltage is set to the predetermined nonzero value by the adjustment circuit during an initial occurrence of the reference state, and (ii) determining deviations from a predetermined sensitivity level by comparing the stored output to an output from the amplifier unit during a subsequent occurrence of the reference state.

* * * * *